No. 708,583. Patented Sept. 9, 1902.
G. G. POWELL.
DREDGING APPARATUS.
(Application filed Dec. 11, 1901.)

(No Model.) 8 Sheets—Sheet I.

Witnesses
Inventor
Geo. G. Powell
By his Attorney
P. T. Dodge

No. 708,583. Patented Sept. 9, 1902.
G. G. POWELL.
DREDGING APPARATUS.
(Application filed Dec. 11, 1901.)
(No Model.)
8 Sheets—Sheet 4.

Fig.6.

No. 708,583. Patented Sept. 9, 1902.
G. G. POWELL.
DREDGING APPARATUS.
(Application filed Dec. 11, 1901.)
(No Model.) 8 Sheets—Sheet 6.

Witnesses
Bert C. Jones
Charles W. Hildreth

George G. Powell, Inventor

UNITED STATES PATENT OFFICE.

GEORGE G. POWELL, OF NEW YORK, N. Y.

DREDGING APPARATUS.

SPECIFICATION forming part of Letters Patent No. 708,583, dated September 9, 1902.

Application filed December 11, 1901. Serial No. 85,445. (No model.)

*To all whom it may concern:*

Be it known that I, GEORGE G. POWELL, of New York, county of New York, and State of New York, have invented a new and useful Improvement in Dredging Apparatus, of which the following is a specification.

The object of my invention is to provide a dredging apparatus of large capacity and great strength which may be cheaply constructed and readily handled.

To this end the invention consists, essentially, in endless series of dredging-buckets arranged to travel one behind another around a float, preferably of circular form, connected to an adjacent hull or boat provided with means for imparting motion to the buckets.

In the preferred form of apparatus I construct a float or buoyant body in the form of a closed cylinder having around its periphery two or more tracks, whereon a series of dredging-buckets with drop-bottoms are arranged to travel in an endless path. The buoyant cylinder is preferably connected with the adjacent boat by devices to effect adjustment in order to regulate the depth of cut and to permit the elevation of the entire bucket mechanism when the dredge as a whole is to be moved from place to place. I preferably construct the buoyant cylinder or float with a longitudinal channel or passage in its upper side, into which the buckets discharge successively as they pass thereover, and I mount in this channel or otherwise a conveying mechanism of any suitable character adapted to delivering spoil from one end of the cylinder either to an adjacent scow, to the spoils-bank, or to the secondary conveyer for delivering the spoils to a distant point. I preferably divide the interior of the cylindrical float into compartments and provide suitable valves and pumping mechanism for flooding and emptying the interior, so that the buoyancy may be varied as circumstances require. It is the intention to have this float, which serves as a support for the circular series of buckets, sufficiently buoyant to carry the whole or the substantial part of the weight of the buckets, their guides, and all attendant parts.

The details of construction may be variously modified without departing from the spirit of my invention.

Referring to the drawings, A represents a floating hull or boat designed to carry engines, boilers, pumps, electric generators, and such other machinery as may be needed in connection with the plant. It may be of any form and construction which will answer for the above-named purpose.

B represents a float or buoyant body, preferably made, as shown, in the form of a strong closed cylinder of large diameter, so that when seated in the water it will have sufficient buoyancy to sustain the weight or the greater part of the weight of the dredging devices carried thereon. This cylinder is arranged with its axis parallel with the end of the boat and is connected to the latter by an intermediate framework C, mounted to slide up and down on suitable guides on the end of the boat, to which it may be secured in different relations, according to the depth to which the excavation is to be carried. The connecting-frame C, which may be of any suitable construction, will be combined with a rack and pinion, screws, or other similar connections permitting its adjustment in relation to the boat. The adjustment may be effected by flooding and emptying the interior of the float, as hereinafter described.

Figure 1:
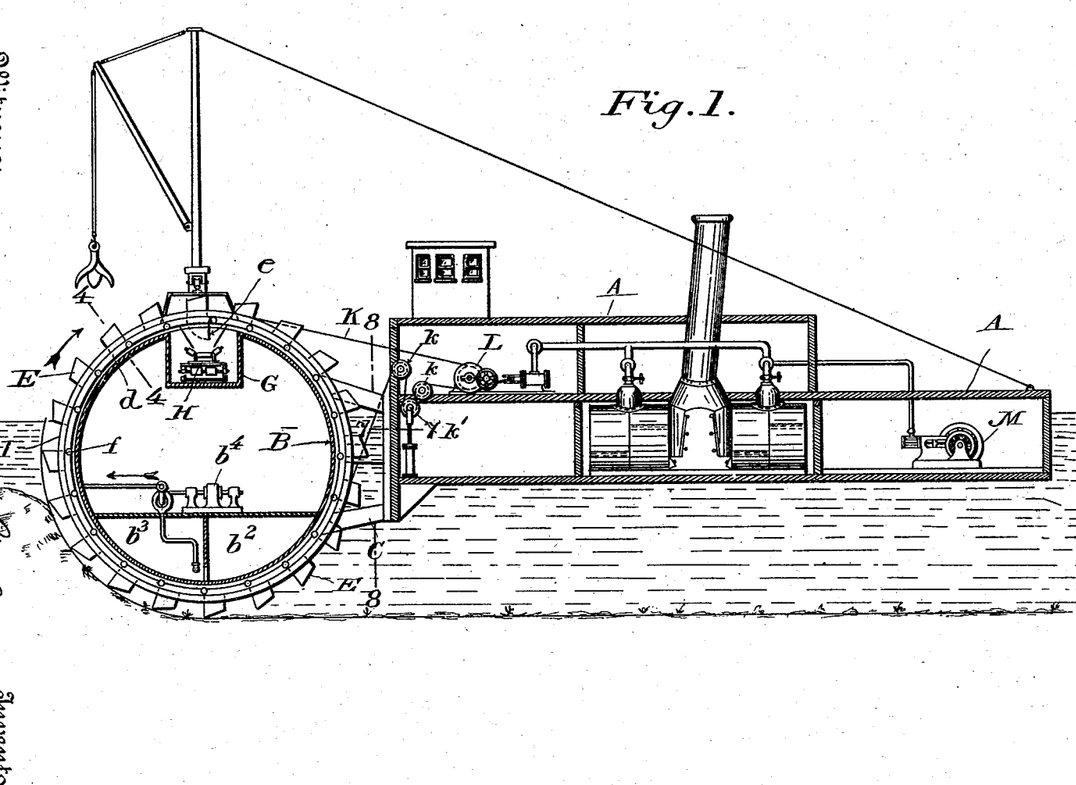
Figure 1 is a longitudinal vertical section of a dredge constructed in accordance with my invention.
Figure 2:
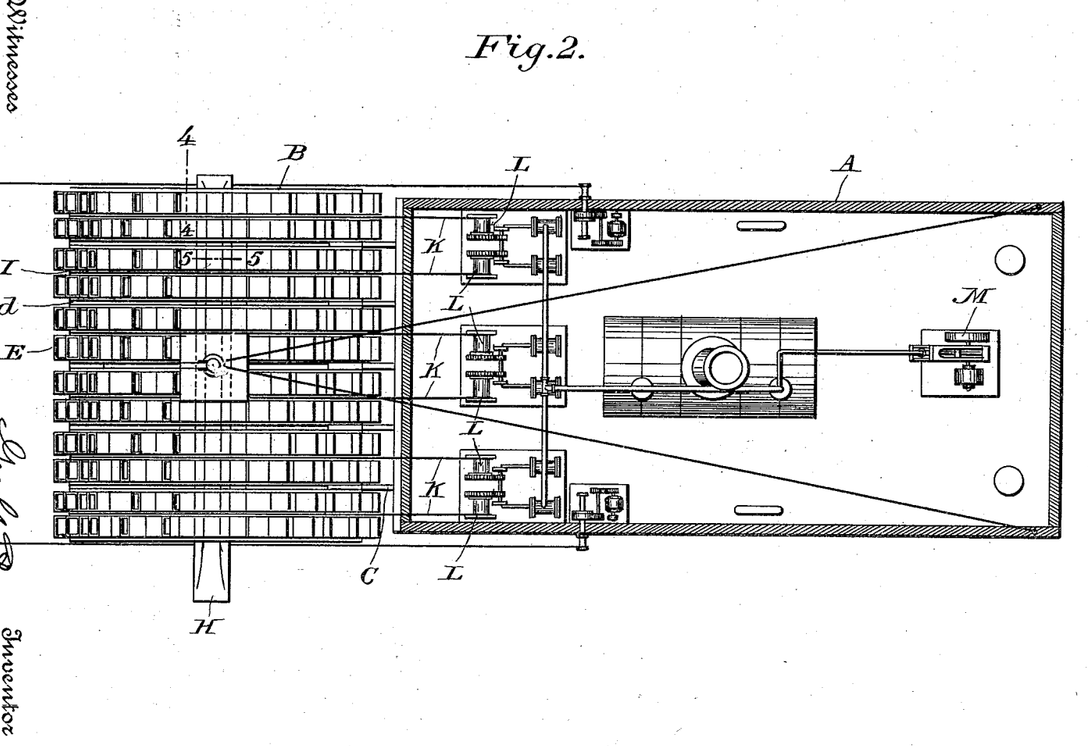
Fig. 2 is a top plan view of the same, the roof of the hull or boat being removed to show the arrangement of the internal driving machinery.
Figure 3:
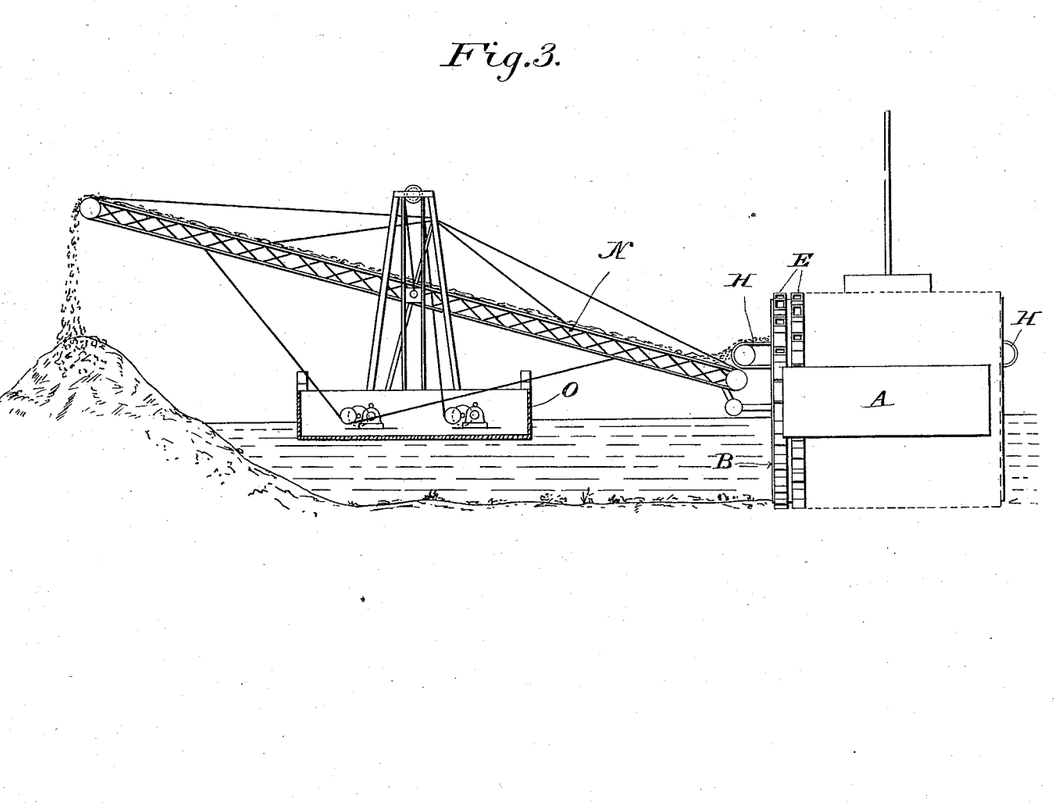
Fig. 3 is an end elevation of the dredge with a supplemental conveyer for tranferring the spoils to the distant bank.
Figures 4, 5:
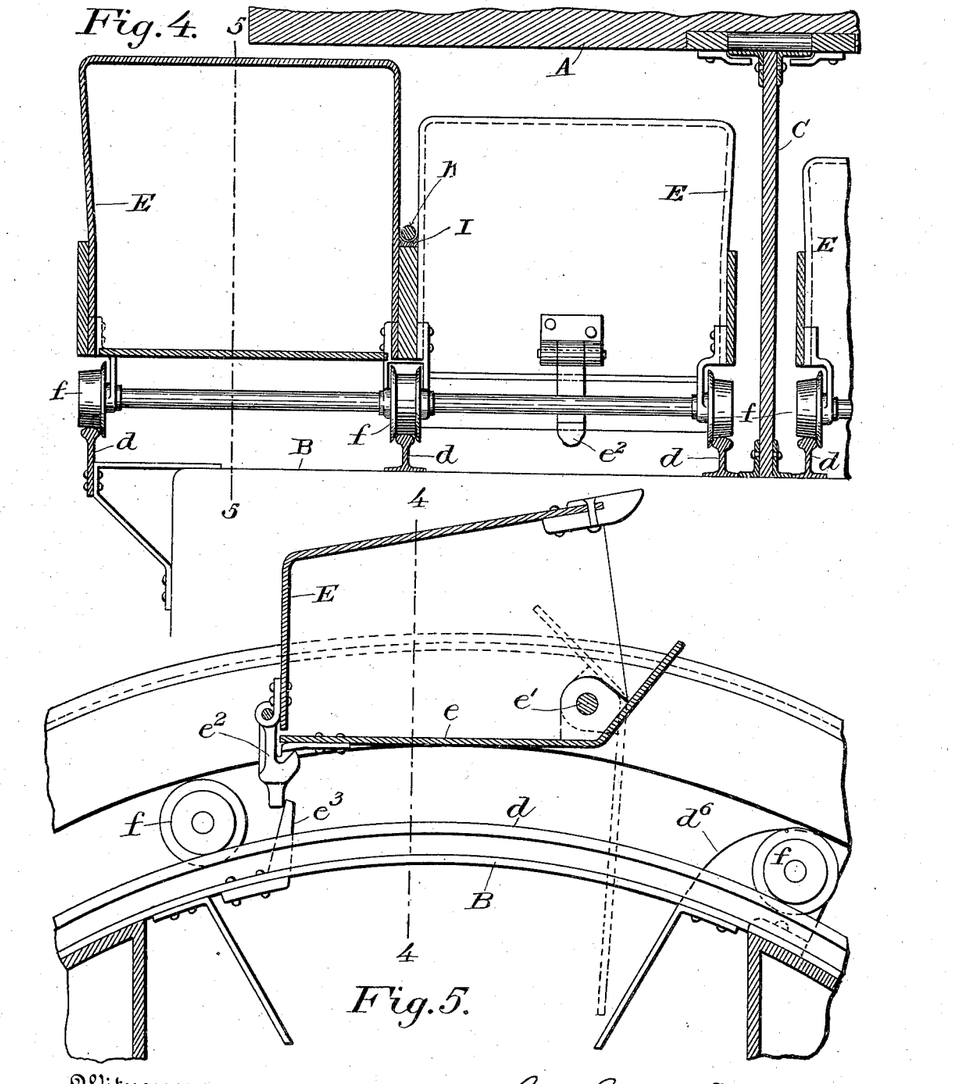
Fig. 4 is a vertical cross-section through one of the dredge-buckets and adjacent parts on the line 4 4 of Figs. 1, 2, and 5.
Fig. 5 is a vertical longitudinal section on the line 5 5 of Figs. 2 and 4.

Around the exterior of the float I mount circular tracks or rails $d$, and on these tracks I mount one or more circular endless chains or series of dredging-buckets E, provided with and sustained by wheels $f$, traveling on the tracks $d$, as shown in the several figures. This arrangement permits each row of buckets to travel continuously around outside of cylindrical float or drum. Each bucket has its under side $e$ hinged at the upper end on a rod $e'$. At the lower end a latch $e^2$, pivoted to the bucket, engages lower end of the hinge side and holds same normally in a closed position. As the buckets ascend on the lower forward side of the drum they are filled with earth, and as each bucket reaches the top of the cylinder its latch $e^2$ encounters a fixed finger $e^3$, whereby the latch is operated to release the hinged side $e$, which immediately falls, as indicated in dotted lines, allowing contents of the bucket to escape. For the purpose of receiving and delivering the spoil as discharged from the successive buckets an open passage or channel G is formed in the upper side of the cylinder in the direction of its length, and in this passage there is mounted, as shown in Fig. 3, an endless carrier H, which receives the spoil and delivers same from the end of the cylinder. This carrier may be of any ordinary or approved construction. I commonly connect two rows of chains or buckets at their inner sides, as shown in Fig. 4, so they will travel together as a single chain, and between them I mount a ring or bearing-surface I to receive driving chain or cable K, which passes around the outside of the float or drum, as shown in Fig. 1, and thence over suitable guide-pulleys to the drum of the driving-engine L on the boat, as shown in Figs. 1 and 2. It will be observed, as seen in Fig. 2, that there is a driving-cable for each double row of buckets and corresponding driving-drums, so that each series of buckets may be driven independently of the others. This arrangement permits speed and cutting action of the different buckets to be varied as the nature of the soil, the depth of the cut, or other circumstances may demand at different points. When the dredge is in action, the series of buckets revolve around the drum in the direction indicated by the arrow, cutting in advance of the boat, each bucket beginning at the bottom and cutting upward to the surface and carrying its load to the top of the cylinder, where the inside is automatically tripped and the contents discharged into the conveyer, by which it is delivered at the side. As each bucket advances its open sides $e$ contact with a stationary surface $d^6$, whereby the side is again closed, so that it may be automatically latched. The driving-cables K are preferably carried each around two fixed guide-pulleys $k$, under a pulley $k'$, attached to the upper end of the piston-rod, the piston of which is mounted in a cylinder and controlled by steam or air pressure or otherwise. This arrangement permits the cable to be tightened and slackened as may be necessary in order to accommodate the vertical adjustment of the drum or float.

In order that the vertical adjustment of the drum may be the more readily effected and the pressure upon the buckets controlled, the lower part of the drum B is preferably divided into two or more compartments $b^2$ and $b^3$. A drainage-pump $b^4$ within the drum-surface delivers the water from these compartments and through the wall of the drum when it is to be lightened to increase its buoyancy. The delivery-pipe of this pump also serves as a means through which water may be admitted from the exterior into the drum when it is to be loaded or its buoyancy diminished. The drainage-pump $b^4$ is preferably attached directly to an electric motor, as shown, so that it may be operated by current transmitted through cable from the generator M on the boat. The flooding-valve may also be of any well-known improved electric valve controlled and operated through suitable conductors from the boat.

Figure 6:
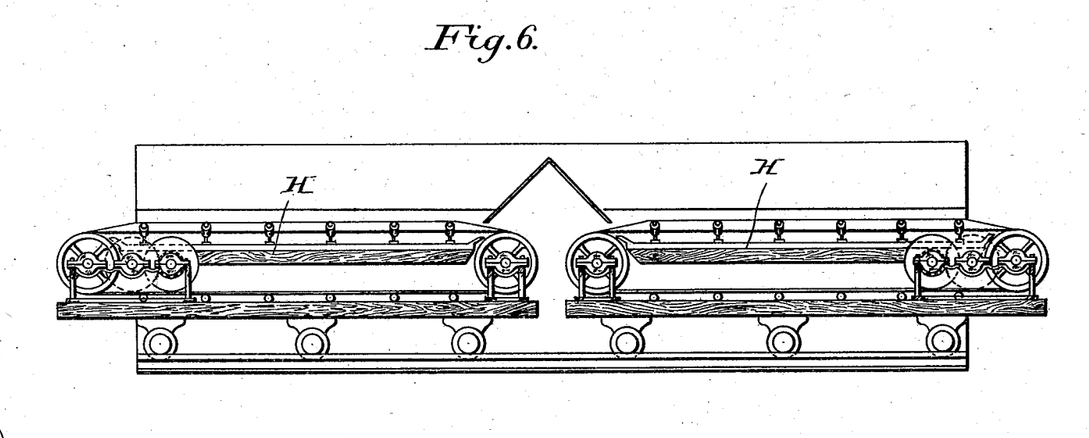
Fig. 6 is a vertical cross-section showing two conveyers arranged to deliver the spoils from the buckets to the right and left.
Figure 7:
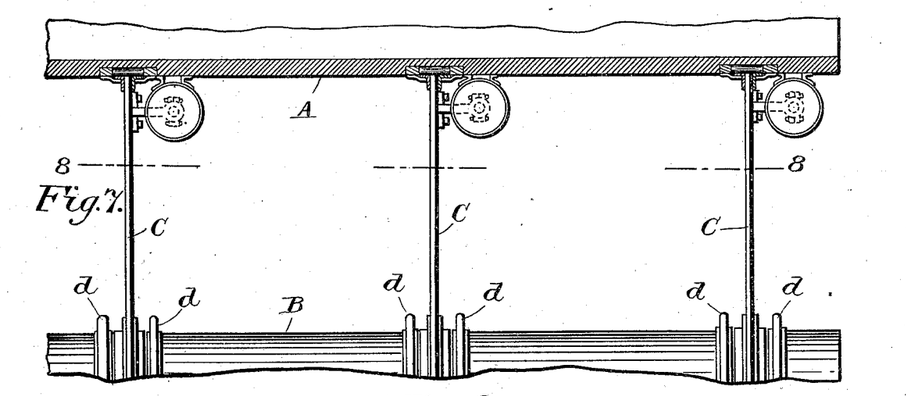
Fig. 7 is a horizontal section on the correspondingly-numbered lines of Fig. 1, illustrating means for adjusting the bucket mechanism or dredge proper in relation to the boat, hull, or scow.
Figure 8:
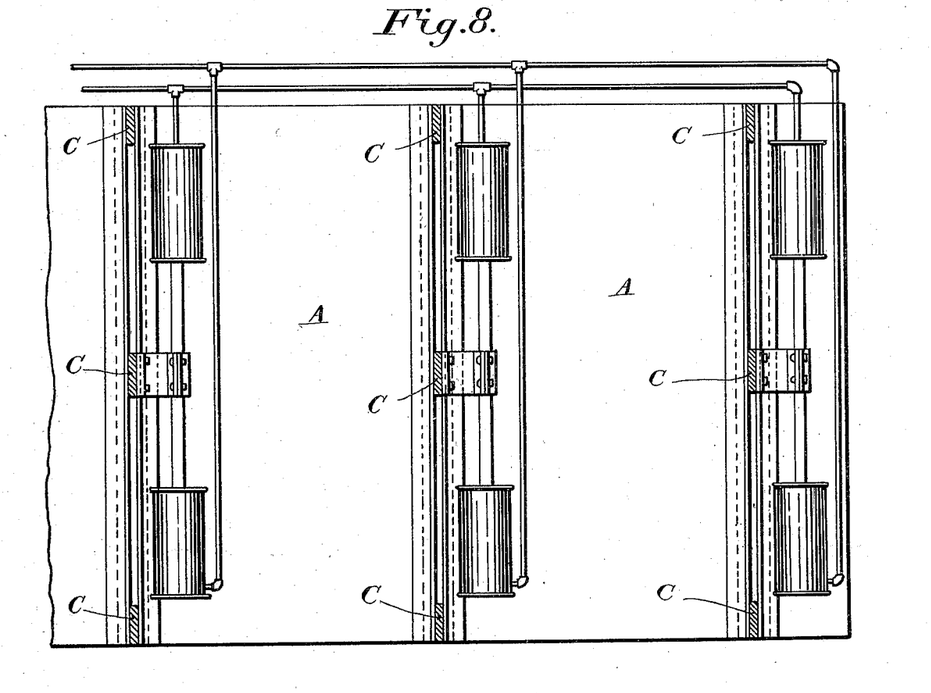
Fig. 8 is a vertical section on the correspondingly-numbered lines of Figs. 1 and 7, showing the mechanism of the preceding figure.
Figure 9:
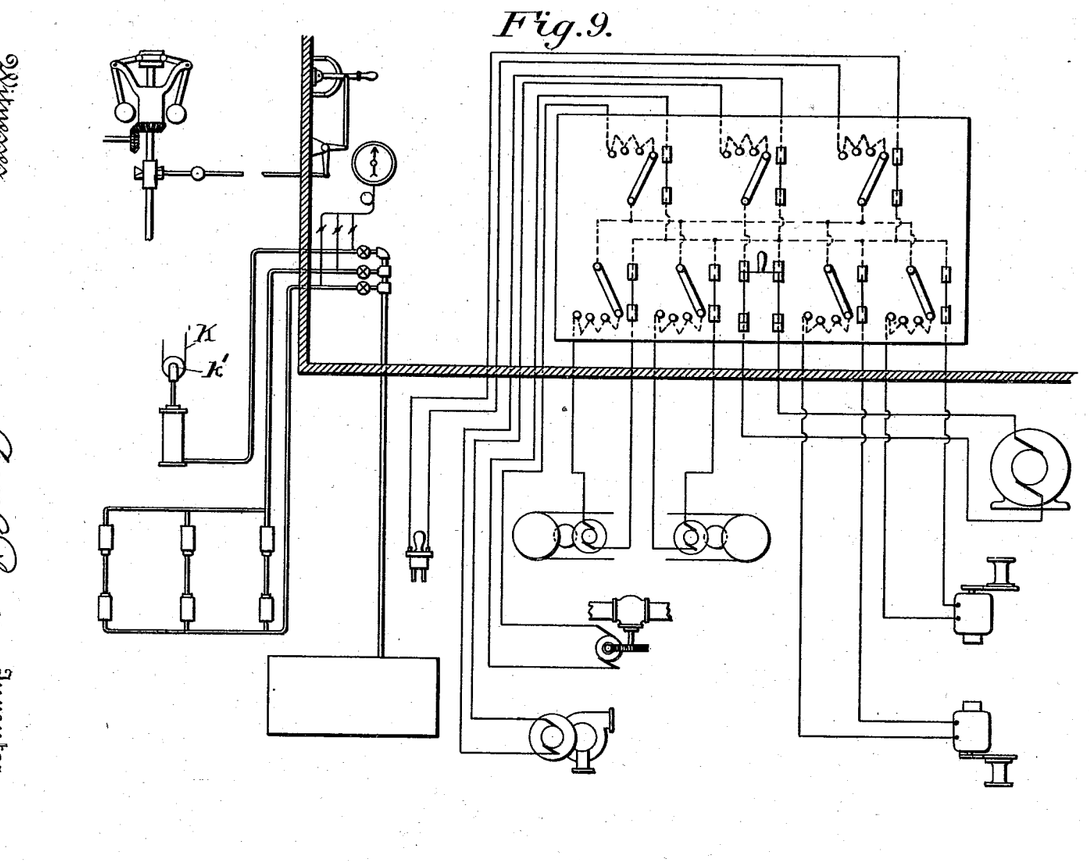
Fig. 9 is a diagram showing the electrical and pneumatic connections.

Instead of using a single conveyer in the upper side of the float or drum I may employ, as shown in Fig. 6, two short conveyers to deliver the spoils in opposite directions from the two ends of the drums.

The spoil delivered by the transverse conveyers may be discharged directly into an adjacent scow or other receiver; but if the delivery is to be effected at a distant point I prefer to employ, as shown in Fig. 3, a long endless conveyer N, centrally sustained by vertical adjustable supports on a scow or boat O, so that while its inner or receiving end retains its position under conveyer H its outer end may be raised or lowered, according to the height at which the discharge is to be effected.

The essence of my invention lies in the employment of an endless series or ring of buckets revolving around an interior float, and while I prefer to make this float of circular form it is to be understood that it may be of any other suitable form, provided it carries the tracks or other supports around which the circular series of buckets may revolve. The drum or float around which the buckets revolve should be of sufficient displacement to carry the weight of the buckets and the cutting load without substantial support from the attendant scow or boat.

Figure 10:
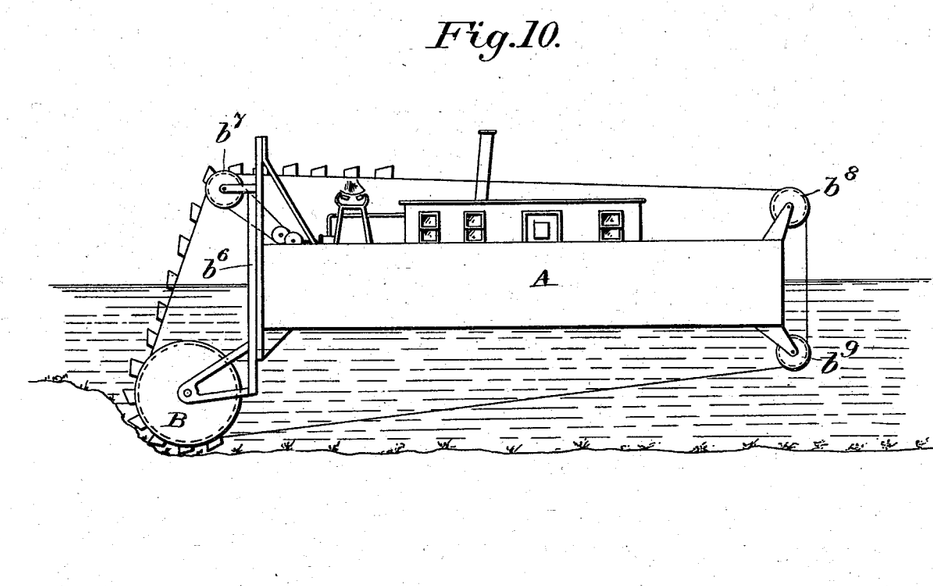
Fig. 10 is a view illustrating a modified form of the apparatus.

In Fig. 10 I have illustrated another form of my apparatus, in which an endless chain of buckets passes vertically around the hull or scow containing the operating mechanism. In this case the drum or float B is of relatively small diameter and completely submerged in deep dredging and is connected to the end of the scow by the vertically-sliding frame $b^6$. The chain of buckets is extended around this drum, thence upward over the supportingdrum $b^7$ of the scow, rearward over the drum $b^8$, and downward around the drum $b^9$, thence rearward to the cutting-point around the drum B.

It is to be noted that the series of buckets extends laterally beyond the line of the sides of the scow and beyond the ends of the sustaining drum or float, so that the dredge proceeding directly forward and without lateral motion will open a channel sufficiently wide for it to float freely therein.

Having thus described my invention, what I claim is—

1. In a dredge, the combination of a buoyant body or float and a series of buckets mounted to travel around said float in a common path.

2. In a dredge, the combination of a buoyant body or float, a circular chain of buckets mounted to travel vertically around the float, an adjacent boat, driving mechanism thereon, and driving connections from said mechanism to the buckets.

3. A buoyant cylindrical body, a boat to which it is adjustably connected, a circular chain of buckets arranged to travel vertically around the cylinder, mechanism for imparting motion to the buckets, and a conveyer moving transversely to the travel of the buckets to carry away the spoil.

4. In a dredge a buoyant cylindrical drum, a circular series of buckets sustained by and traveling vertically around the drum, and each having a hinged side to discharge the contents, and means for automatically opening and closing the same.

5. In a dredge, a boat, an adjacent float, and vertically-adjustable connections between them, in combination with a circular series of dredging-buckets mounted to revolve around the float, mechanism for driving the buckets, and means for flooding and draining the float.

6. In a dredge, in combination with the boat adjustably connected thereto, the cylindrical drum, tracks encircling the same, an endless chain of buckets traveling on the tracks, driving mechanism mounted in the boat and connected with the buckets, and means for conveying away the spoil discharged from the buckets.

7. The float, the chain of buckets provided with opening sides and arranged to travel around the float, in combination with means for automatically opening and closing the buckets.

8. In a dredge, the combination of a buoyant body, parallel endless series of buckets revolving around the same, and means for driving the different series independently, whereby they may be actuated at different speeds for one series while another is at rest, as the character of the soil or other conditions may demand.

9. In a dredge, the combination of a scow and a connected buoyant body, an endless series of buckets arranged to travel vertically around the buoyant body, said buckets extending laterally beyond the sides of the scow, whereby they are adapted to open a channel wider than the scow, substantially as described and shown.

10. In a dredge, the combination of a hull or scow with driving mechanism thereon, a drum or float located in advance of the hull and connected thereto by means for vertical adjustment, parallel series or chains of buckets arranged to travel vertically around the float, driving-cables extended from the respective series of buckets to the independent driving mechanism on the scow, and means for controlling the tension of the respective cables independently.

11. In a dredge, a hull or scow and bucket-driving mechanism mounted thereon, in combination with parallel chains of buckets, located directly in front of the scow and extending beyond the sides of the latter, the arrangement being substantially such as described and shown, to open in advance of the scow a channel for its passage.

In testimony whereof I hereunto set my hand, this 5th day of December, 1901, in the presence of two attesting witnesses.

GEORGE G. POWELL.

Witnesses:
S. B. ROBERTSON,
WASH. BOYMANS.